Figure 1:
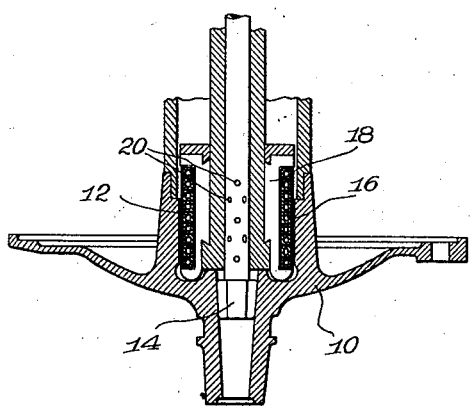

April 28, 1942.  H. E. SOMES  2,281,332
METHOD OF VARYING DIMENSIONS
Filed April 8, 1939

INVENTOR:
Howard E. Somes
BY
ATTORNEY

Patented Apr. 28, 1942

2,281,332

UNITED STATES PATENT OFFICE 2,281,332

METHOD OF VARYING DIMENSIONS

Howard E. Somes, Grosse Pointe Park, Mich., assignor to Budd Induction Heating, Inc., Philadelphia, Pa., a corporation of Michigan Application April 8, 1939, Serial No. 266,911

8 Claims. (Cl. 29—149.5)

The present invention relates to a method of permanently varying a dimension of a metallic object, for example reducing the internal diameter of a bore or aperture in a metallic sleeve or other hollow body.

The invention has especial application to wheel hubs having internal bearing surfaces which must have certain specified internal diameters and which may have been inadvertently over bored, or become enlarged through wear, so that it becomes desirable to reduce the diameter so that a new bearing surface of correct dimensions may be obtained, thus saving expensive parts from the scrap heap. The invention may also be applied to worn cylinder walls and have many other widely diversified applications as will appear more fully hereinafter.

An object of the invention is to provide a method of decreasing the diameter of an internal bore, or the opening in a hollow object by quickly heating the internal layers to a plastic state progressively from the inside toward the outside over a period of time and thereafter permitting slow gradual cooling, thus causing the inner surface to reduce its diameter relative to the outside diameter. A further object relates to the use of electromagnetic induction apparatus for generating the required heat thereby providing a clean source of heat readily controllable to produce any degree of heating and thus any degree of contraction. More broadly stated an object of the invention is to permanently change a dimension of a metallic object, preferably having a cylindrical surface, by electromagnetic induction, either by reducing an internal bore dimension or increasing the external diameter. Other objects and novel features will appear from the following specification.

For the sake of simplicity the invention will be described in connection with the reduction of the internal diameter of a wheel hub having a central portion in the form of a thick sleeve.

In order to reduce the diameter of the bore of such an article according to the present invention the internal layers are heated by electromagnetic induction to a plastic state, the heat being applied at a rate to almost instantaneously heat the layers, and the heat is maintained for a period of from three to five seconds. The length of time the heating is in effect will determine the depth and degree of plasticity, but heating should not be so great as to materially produce any heat directly in the outer layers which would cause the outer layers to soften. The external cold diameter should not change as a result of the heating except for changes resulting from internal stresses. Such stresses as exist in the outer layers should be kept within the elastic limit of the material. While the whole article becomes heated to some extent, the heat in the outer layers results from heat conduction from the inner layers after the electric induction heating has been discontinued. Thus the outer layers are maintained throughout the process at a temperature well below any temperature which would cause any substantial change in the external layers or shell, so that the shell remains intact and rigid and forces the internal layers to expand inwardly.

With the external shell maintained relatively cool and rigid, the heated plastic internal layers find it necessary to expand due to the heating and as a result expand radially inward. With subsequent cooling in air, the internal surface cools below the temperature of the plastic state first with a corresponding reduced diameter and the internal layers adjacent thereto subsequently cool, with the result that the internal diameter remains reduced, and the axial length of the inner layers correspondingly decreases to compensate for increase in radial thickness.

In a hub having an internal bore of approximately three inches, the reduction in diameter may be controlled by the length of heating so as to vary the same directly in proportion thereto in any amount up to as much as forty-five or more thousandths of an inch.

With such a reduction, enlargement due to wear, or accidental over-bore or scoring may be completely compensated for and the part rebored, thus saving the same from the reject or scrap pile as would otherwise be the case.

After reducing the internal diameter and cooling in air, the desired bore diameter may be machined and the internal surface thereafter heat treated to produce the desired hardness and thereafter ground. The preferred form of heat treatment is also produced by electro-magnetic induction, the heat being applied for a shorter time, for example from 1.5 to 2 seconds, so that the outer layers remain substantially cold, and act as a quench to the heated layers. In addition the inner surface may preferably be quenched thus quenching in effect both sides of the heated internal layer and surface.

Subsequent to the heat treatment, the internal surface may be ground to precision dimensions.

While it may appear that other forms of hardening treatment may be substituted for the electro-magnetic inductive method described, the short duration of time, the cleanness of operation, and the uniformly thick and hard layer produced, backed by the unchanged uniformly soft shell layers, excepting for a narrow bordering layer in between, render the herein described use of electro-magnetic induction hardening treatment of especial advantage.

The invention may be performed with apparatus such as that illustrated and briefly described herein and more particularly described in my copending application Serial No. 101,993 filed September 22, 1936.

Figure 2:
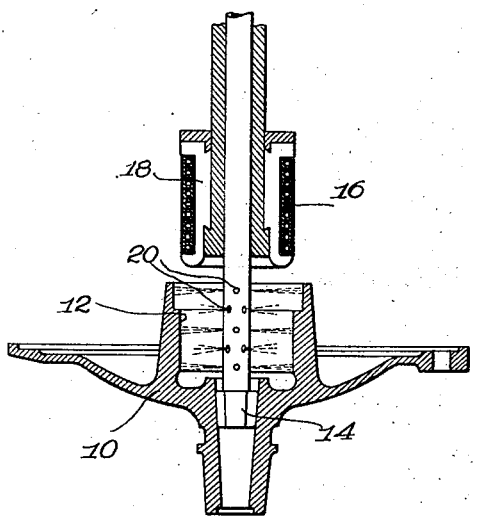

In the illustrations, wherein like reference numerals indicate like parts, Figure 1 shows a heating unit in inductive relation to a wheel hub for either diameter reduction or subsequent reheat and hardening treatment, and in Fig. 2 there is shown the same unit in operative position for quenching.

As shown a wheel hub 10 having an internal surface 12 adapted to be reduced in diameter is arranged around an electro-magnetic induction heater having a centering post 14. The heater is provided with a helical fluid cooled inductor coil, embraced by a magnetic core 18, which together with the magnetic material of the hub and/or the surrounding air provide a magnetic path of low reluctance, and permits the substantially instantaneous exchange of enormous amounts of electrical energy so that plastic heat results almost instantaneously, the depth of the plasticity of course varying with the time of application and thus controlling the extent of the radially inward upset. The same apparatus may be used for internal diameter reducing as well as the subsequent step of rehardening in which case the centering post may be hollow and provided with spray jets 20, for quenching and which jets are readily exposed by relative movement between the inducing coil and the centering post 14.

In the application of the process to long bearings, it may be desirable in order to reduce axial stresses, to cut annular grooves of a depth up to approximately the depth of plastic heating in the internal surface whose diameter is to be reduced or shallow spiral grooves to break the surface on cooling so that either sectional heating as between annular grooves or progressive heating may be resorted to to reduce the extent of axial stresses which might result from the resulting extended axial shrinkage, although it will be well understood that if the entire inner surface layers be heated to plasticity simultaneously such extended axial shrinkage as is necessary to compensate for radial reduction offers no serious difficulty.

There has thus been described in some detail a novel process capable of quickly, positively and controllably reducing bore diameters as much as forty-five or fifty thousandths of an inch in a single short operation and without injury to the work piece. With subsequent repetition, further reductions in diameter can be effected, but in practice, correction for overbore, wear, scoring or the like such as occurs in bearings, cylinder bores, and other hollow objects generally is of such a slight character as to be completely compensated for by a single operation. Since the work piece is not injured in any way, it is capable of being subsequently heat treated, with a resulting hardened layer comparative to any hardening directly accomplished without such diameter reduction. In fact the heating to reduce internal diameter tends to homogenize the metal.

The same principle will also apply to increasing the outside dimension or diameter of an object, it merely being necessary to heat the external layers and thereafter allow cooling in air. The degree of change, however, will not be so great since there is a crowding action in expanding radially inward as in a bore, whereas the opposite is true when the external layers expand radially outward.

Though the method has been set forth in detail in connection with a particular use, that of reducing hub bores, it is understood that the invention is not limited thereto but may be practiced in various ways on a variety of articles, some of which have been suggested. As many variations may be practiced without departing from the spirit of the invention as will be apparent to those skilled in the art, reference will be had to the appended claims for a definition of the limits of the invention.

What is claimed is:

1. The method of reducing the internal diameter of the bore of a sleeve without materially changing the external diameter thereof, which comprises generating annular heating currents in the internal layers of said sleeve by electro-magnetic induction to uniformly heat an annular internal zone to a plastic state for approximately 3 to 5 seconds subsequently cooling in air, while maintaining the outer layers sufficiently cool whereby upon complete cooling the outer layers will return substantially to their normal original dimension, and said inner layers will have been forced to expand and upset inwardly while in the plastic state.

2. The method of reducing the internal diameter of the bore of a sleeve without materially changing the external diameter thereof, which comprises generating annular heating currents in the internal layers of said sleeve by electro-magnetic induction to uniformly heat an annular internal zone to a plastic state for a length of time in proportion to the desired reduction in diameter, subsequently cooling in air, while maintaining the outer layers sufficiently cool whereby upon complete cooling the outer layers will return substantially to their normal original dimension and said inner layers will have been forced to expand and upset inwardly while in the plastic state.

3. The method of providing in a sleeve a hardened internal integral bearing surface of smaller diameter than the bore of the sleeve, which comprises generating annular heating currents in the internal layers thereof by electro-magnetic induction to uniformly heat an annular internal layer to a plastic state for a length of time in proportion to the desired reduction in diameter, subsequently cooling in air to produce a reduction in internal diameter less than the diameter of the bearing surface sought, trimming said diameter to the desired diameter, heating a portion or all of said internal layers of said sleeve to the plastic stage by electro-magnetic induction, subsequently quenching the sleeve to produce the desired hardness in the internal layers and surface and grinding the internal hardened surface true.

4. The method of changing a dimension of a magnetic article, which comprises generating annular heating currents in a portion of said article to heat the portion to incipient fusion by electro-magnetic induction for a period of time dependent on the desired degree of change while retaining the remainder within the elastic limit, subsequently cooling in air, machining said portion to a desired dimension thereafter heating the portion of said article by electro-magnetic induction, quenching to harden and thereafter grinding said portion to a precision dimension.

5. The method of providing in a sleeve a hardened internal integral bearing surface of smaller diameter than the bore of the sleeve, which comprises generating annular heating currents in the internal layers thereof by electromagnetic induction to uniformly heat an annular internal layer to a plastic state for a length of time in proportion to the desired reduction in diameter, subsequently cooling in air to produce a reduction in internal diameter less than the diameter of the bearing surface sought, trimming said diameter to the desired diameter, heating a portion or all of said internal layers of said sleeve to the plastic stage by electromagnetic induction, and subsequently quenching the sleeve to produce the desired hardness in the internal layers and surface.

6. The method of changing a dimension of a magnetic article, which comprises generating annular heating currents in a portion of said article to heat the portion to incipient fusion by electromagnetic induction for a period of time dependent on the desired degree of change while retaining the remainder within the elastic limit, subsequently cooling slowly, thereafter heating the portion of said article by electromagnetic induction, and quenching to harden.

7. The method of changing a dimension of a magnetic article, which comprises generating annular heating currents in a portion of said article to heat the portion to incipient fusion by electromagnetic induction for a period of time dependent on the desired degree of change while retaining the remainder within the elastic limit, subsequently cooling slowly, thereafter heating the portion of said article by electromagnetic induction, quenching to harden and thereafter grinding said portion to a precision dimension.

8. The method of changing a dimension of a magnetic article, which comprises generating annular heating currents in a portion of said article to heat the portion to incipient fusion by electromagnetic induction for a period of time dependent on the desired degree of change while retaining the remainder within the elastic limit, subsequently cooling slowly, machining said portion to a desired dimension, thereafter heating the portion of said article by electromagnetic induction, and quenching to harden.

HOWARD E. SOMES.